Dec. 24, 1963 L. B. PENLAND 3,115,348
POSITIVE DRIVE FOR ROTATABLE TOOLS
Filed Feb. 10, 1961 2 Sheets-Sheet 1
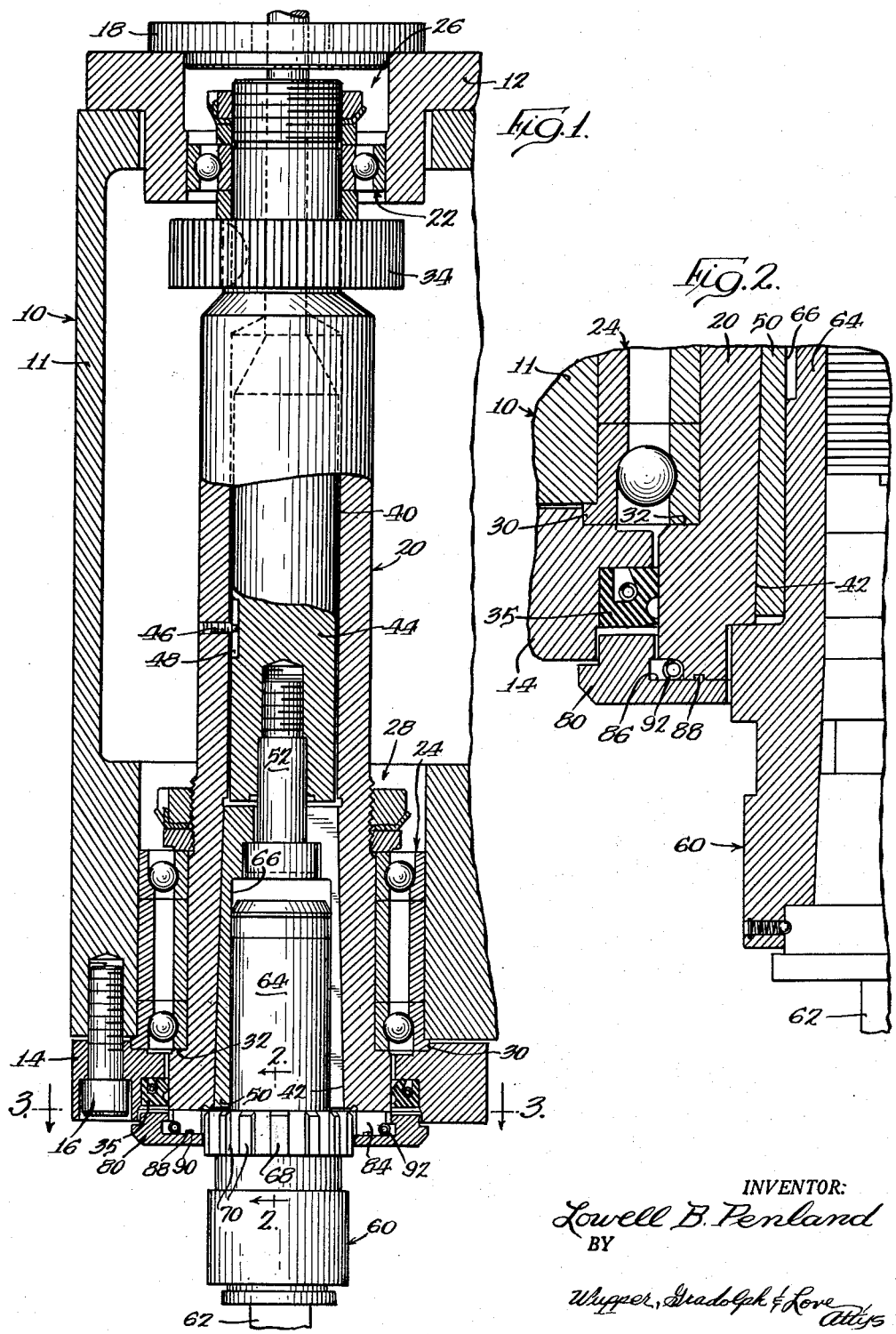
INVENTOR:
Lowell B. Penland
BY
Whipper, Bradolph & Love
Attys

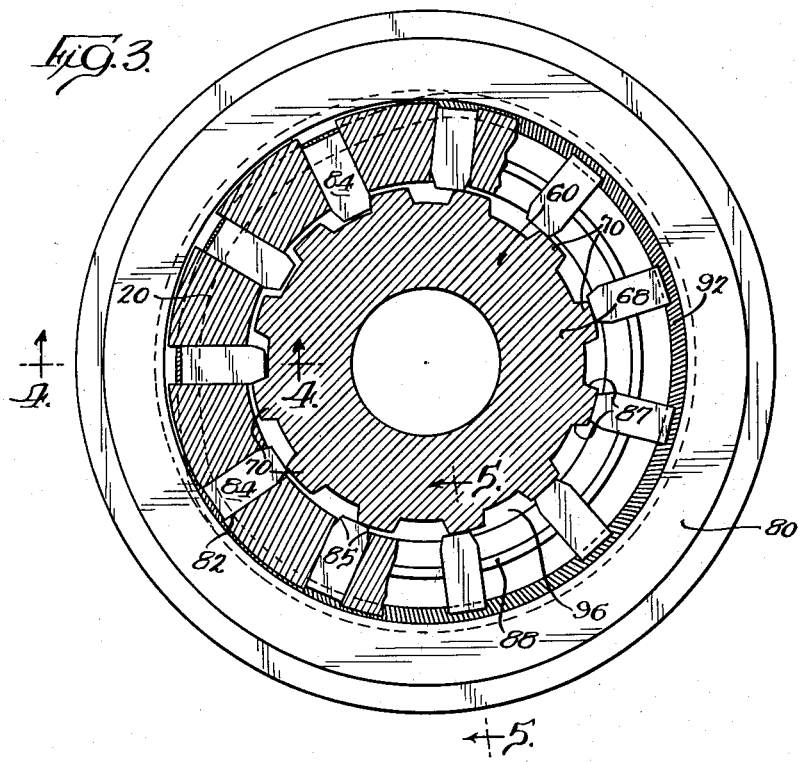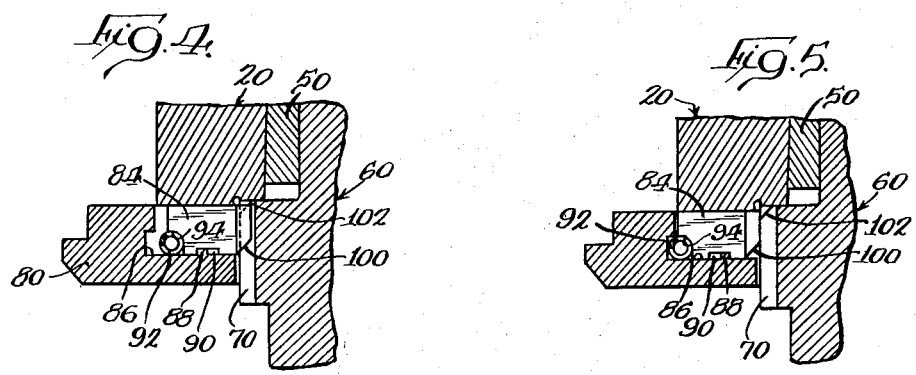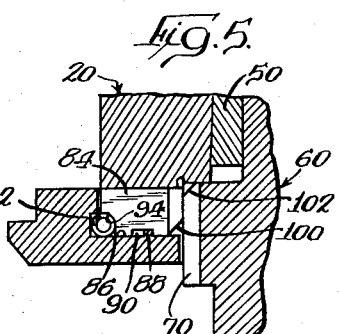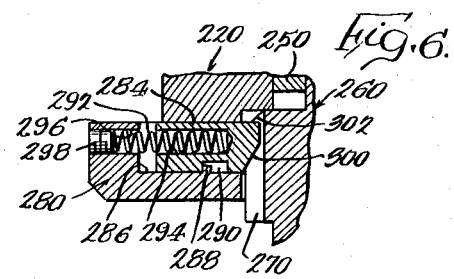

United States Patent Office 3,115,348
Patented Dec. 24, 1963

3,115,348
POSITIVE DRIVE FOR ROTATABLE TOOLS
Lowell B. Penland, Richmond, Ind., assignor to National Automatic Tool Company, Inc., Richmond, Ind., a corporation of Indiana
Filed Feb. 10, 1961, Ser. No. 88,551
7 Claims. (Cl. 279—51)

This invention relates generally to machine tools and more particularly to an improved positive drive means for a rotatable tool such as a drill, a tap or the like.

In machine tools of the type in which drilling, boring, tapping, facing, and milling operations are performed, it is desirable to provide a chucking means which provides a reliable drive for both light and heavy loads and which does not require accurate angular positioning of the tool relative to the chucking means or which requires substantial amounts of time and effort in mounting the tool within the chucking means. It is to the provision of a rapidly operable means for chucking a tool in the chucking means without regard to the angular position of the tool relative to the chucking means to which the present invention is directed. Although the improved chucking means of the present invention is particularly well adapted for use in a machine tool of the type disclosed in United States Patent No. 2,901,927, issued September 1, 1960, to Mark Morgan, in which the tools are inserted and removed automatically, nevertheless it is equally well adapted for use in machine tools of the type in which the tools are manually inserted and removed, such as that of United States Patent No. 2,793,546, dated May 28, 1957, to Earl E. Opel.

It is therefore a principal object of the present invention to provide an improved positive drive chucking means in which the angular position of the tool relative to the chucking means does not affect the provision of a positive drive. In the preferred embodiment this is accomplished by providing a plurality of spring-loaded radially movable keys on the spindle and a plurality of gear teeth, greater in number by one than the keys, on a tool holder so that one or more of the keys and teeth mesh for a positive drive connection in all angular positions of the tool holder relative to the spindle. Any initial slip in the drive connection is minimized by having a large number of keys and teeth, for example eleven and twelve respectively.

Another object is to provide an improved chucking means which provides both a frictional drive for light loads and a positive drive for heavy loads which insures the load carrying capacity of the drive means up to its rated torque.

Another object is to provide an improved chucking means with positive and accurate axial location of the tool to make possible in an automatic machine the accurate control of the depth of the cut to be made.

Another object is to provide an improved chucking means which incorporates a positive drive in either direction of the drive means rotation and which assures automatic orientation of the positive drive means regardless of the angular position of the tool when it is received by the chucking means.

Another object is to provide an improved positive drive chucking means in which the positive drive is provided regardless of the angular position of the tool relative to the chucking means with a minimum amount of angular slip between the chucking means and the tool upon initial operation of the drive means under a heavy load.

Other objects and advantages of the present invention will become apparent from the following description taken in conjunction with the accompanying drawings in which:

FIG. 1 is a fragmentary sectional view of the head of a single spindle machine tool incorporating the improved drive means of the present invention;

FIG. 2 is an enlarged fragmentary sectional view of the spindle, the tool holder and the improved positive drive means taken substantially along line 2—2 of FIG. 1 looking in the direction of the arrows;

FIG. 3 is a horizontal sectional view of the improved positive drive means taken substantially along line 3—3 of FIG. 1 looking in the direction of the arrows;

FIG. 4 is a fragmentary sectional view taken substantially along line 4—4 of FIG. 3 looking in the direction of the arrows and showing one portion of the improved positive drive means in an effective driving position;

FIG. 5 is a fragmentary sectional view taken substantially along line 5—5 of FIG. 3 looking in the direction of the arrows and showing a portion of the improved positive drive means in an ineffective position; and FIG. 6 is a fragmentary sectional view similar to FIG. 4 of another embodiment of the invention.

As best seen in FIG. 1, the invention is illustrated as embodied in a single spindle machine tool having a head portion 10 which is adapted for movement to a drilling position by well known manual or automatic operation. The head 10 includes a casing 11 having upper and lower annular spindle support plates 12 and 14 suitably secured thereto by means of screws 16, and a cap 18 partially closes the opening in the upper end of the support plate 12. An elongated, generally cylindrical hollow spindle 20 is journaled for rotation in bearings 22 and 24 which are carried by the head 10 and the support plates 12 and 14. Suitable lock washer and nut assemblies 26 and 28 are threaded on the spindle 20 and suitably secure the spindle against axial movement relative to the bearings. The bearings 24 include a lower annular flange 30 which is retained between the body portion 10 of the head and the lower plate 14. This accurately locates the axial position of the lower bearing 24, and this lower bearing in turn determines the axial position of the spindle 20 by reason of the fastening means 28 bringing the shoulder 32 of the spindle tightly against the lower end of the bearing structure 24. The spindle 20 is driven by a spur gear 34 keyed thereto and connected to a drive motor (not shown) by a well known gear train means (not shown). A suitable lubricant seal 35 is provided between the spindle and the plate 14.

The spindle 20 includes an upper generally cylindrical hollow portion 40 and a lower inwardly tapered hollow portion 42. A draw bar 44 is received in the hollow portion 40 for reciprocable movement and a set screw 46 in the spindle cooperates with a key slot 48 in the draw bar to key the draw bar to the spindle for rotation therewith while permitting relative reciprocable movement of the draw bar with respect to the spindle. The draw bar movement is controlled in a well known manner by a suitable hydraulic means.

A generally truncated conical split collet 50 is received in the lower tapered portion 42 of the spindle and is secured to the lower end of the draw bar by means of a screw 52 with provision for a small amount of reciprocable lost motion between the collet and draw bar.

A tool holder 60 carrying a tool 62 includes an upper cylindrical portion 64 which is adapted to be received within a cylindrical opening 66 in the collet. The tool holder also includes a central gearlike portion 68 having a plurality of teeth 70.

A generally annular retainer 80 is secured to the lower end of the spindle 20 by suitable screws (not shown). As best seen in FIG. 3, the lower end of the spindle 20 has a plurality of outwardly open radial slots 82 formed therein, the slots being equally angularly spaced about the axis of the spindle, and a generally rectangular key 84 is slidably positioned in each of the slots and fits with sufficient clearance to permit reciprocable movement within the slot. The lower faces of the keys, as best seen in FIGS. 4 and 5, slide on an internal shoulder 86 of the retainer 80, and an annular land 88 on the retainer shoulder and elongated cooperating slots 90 on the lower surfaces of the keys cooperate to limit the reciprocable movement of the keys toward and away from the axis of the spindle. A garter spring 92 is received in notches 94 at the outer ends of each of the keys 84 and urges the keys toward the axis of the spindle.

As seen in FIG. 3, the arcuate width of each of the keys 84 is substantially less than the width of spaces 96 between the teeth 70. In the preferred embodiment there are twelve teeth and eleven keys. Since the keys are fewer in number by one than the spaces 96 between the teeth and since the keys are substantially narrower than the spaces, in all radial positions of the tool holder 60 relative to the spindle 20 at least one of the keys 84 will be in its innermost radial position within a space 96 and will be in engagement with a tooth 70 to provide a positive drive between the spindle and the tool holder. In some instances, for example as shown in FIG. 3, three of the keys will be in corresponding spaces 96. It will also be observed in FIG. 3 that, irrespective of the relative angular positions of the tool holder and spindle and the direction of spindle drive, only a very small amount of angular slip may occur between the spindle and tool holder before the positive drive action is provided by engagement of the leading edge of one of the keys with the adjacent edge of one of the gear teeth 70. The inner ends of the keys 84 are chamfered at 85 to form driving surfaces making a small angle with radial lines emanating from the spindle axis, and these surfaces mate with parallel chamfered driven surfaces 87 on the teeth 70. This assures a large area surface contact between the keys and teeth to minimize wear, and at the same time the chamfering permits the keys to move into the spaces 96 between the teeth more readily.

Upon initial insertion of the tool holder 60 into the collet 50, the tool holder is forced upwardly (FIG. 1) until it is firmly pressed within the aperture 66 in the collet. The draw bar is then moved upwardly in a well known manner pulling the collet with it. As the collet moves upwardly within the tapered opening 42 in the spindle, the sides of the collet are squeezed by the spindle to tightly grip the upper shank portion 64 of the tool holder to provide a substantial frictional driving engagement therewith. The tool holder and collet move upwardly with the draw bar until the upper shoulder of the gearlike portion 68 of the tool holder engages the adjacent annular bottoming shoulder on the spindle accurately to position the tool holder axially with respect to the spindle.

The lower portions of the inner ends of the keys 84 are chamfered at 100 and the upper ends of the teeth 70 are chamfered at 102 so that when inserting the tool holder keys which are engaged by teeth are readily cammed outwardly to positions clearing the teeth (FIG. 5).

To remove the tool holder after the machining operation, the draw bar is moved downwardly (FIG. 1) to force the collet and tool holder to the release position in which the clamping force of the collet on the tool holder is sufficiently relieved to permit removal of the tool holder either manually or automatically.

In the embodiment of FIG. 6, elements corresponding to those shown in the embodiment of FIGS. 1–5 have similar reference numerals with the prefix 2 added thereto. Accordingly, this embodiment includes a spindle 220 which may for example be incorporated in the single spindle machine tool of FIG. 1. A shallow generally cup-shaped retainer 280 is secured to the spindle by machine screws (not shown), and a plurality of keys 284 are slidably positioned in slots at the lower end of the spindle and held in the slots by the retainer. The keys slide on the internal shoulder 286 of the retainer, and an annular land 288 on the retainer shoulder and cooperating slots 290 on the lower surfaces of the keys limit the reciprocable movement of the keys toward and away from the axis of the spindle.

This embodiment differs from that of FIGS. 1–5 in that each key is provided with a helical biasing spring 292 rather than a garter spring common to all keys. Each spring 292 is inserted into a bore 294 in its respective key and extends outwardly therefrom into a coaxial bore 296 in the retainer. A threaded plug 298 inserted in the threaded outer end of the bore 296 holds each spring 292 in place and adjusts the biasing force applied to the key.

The inner ends of the keys are chamfered at 300 and the upper ends of teeth 270 on a tool holder 260 are chamfered at 302 to cam keys engaging the teeth outwardly against the force of the springs 284 to positions clearing the teeth. The tool holder 260 is received in a split collet 250 in the manner described above with respect to FIGS. 1–5.

It will be appreciated that the preferred embodiments may be modified in many readily apparent ways without departing from the spirit of the invention such as providing the spindle with gear teeth and the tool holder with keys or providing keys greater in number than the teeth.

From the foregoing description it will be apparent that the objectives which were claimed for this invention are readily obtained.

While two embodiments of the positive drive chucking means for rotatable tools have been shown and described, it will be apparent that modifications and variations thereof may be made without departing from the underlying principles of the invention. It is therefore desired, by the following claims, to include within the scope of the invention all such modifications and variations by which substantially the results of this invention may be obtained through the use of substantially the same or equivalent means.

What is claimed as new and desired to be secured by United States Letters Patent is:

1. In a machine tool, a hollow rotatable spindle having a plurality of circumferentially spaced radial openings, a plurality of keys reciprocably mounted in the openings, a split socket-like collet mounted within the spindle, a tool holder removably mounted in the socket of said collet for tight frictional engagement therewith, the tool holder having a plurality of circumferentially spaced teeth differing in number by one from the number of keys and positioned opposite the keys in the operating position of the tool holder in the collet for receipt of at least one key between adjacent teeth in all angular positions of the tool holder in the spindle, and means urging the keys toward the tool holder for a positive drive connection between the spindle and tool holder in either direction of spindle rotation.

2. In a machine tool, a hollow rotatable spindle having a plurality of circumferentially spaced radial openings, a plurality of keys reciprocably mounted in the openings, a split socket-like collet mounted within the spindle, a tool holder removably mounted in the collet for tight frictional engagement therewith, the tool holder having a plurality of circumferentially spaced teeth greater in number by one that the number of keys and positioned opposite the keys in the operating position of the tool holder in the socket of said collet with a spacing between teeth and keys greater than the width of the teeth and keys for receipt of at least one key between adjacent teeth in all angular positions of the tool holder in the spindle, and means urging the keys toward the tool holder for a positive drive connection between the spindle and tool holder in either direction of spindle rotation.

3. In a machine tool, a hollow rotatable spindle having in the order of eleven equally spaced radial openings, a key reciprocably mounted in each opening, a split socket-like collet mounted within the spindle, a tool holder removably mounted in the socket of said collet for tight frictional engagement therewith, the tool holder having a plurality of equally spaced teeth differing in number by one from the number of keys and positioned opposite the keys in the operating position of the tool holder in the collet with the spacing between teeth and keys being greater than the width of the keys and teeth respectively for receipt of at least one key between adjacent teeth in all angular positions of the tool holder relative to the spindle, and means urging the keys toward the tool holder, thereby to provide a positive drive connection between the spindle and tool holder in either direction of spindle rotation.

4. The combination set forth in claim 3 in which the engaging ends of the keys and teeth are chamfered to cam the interfering keys outwardly away from the teeth they engage during insertion of the tool holder.

5. In a machine tool, the combination comprising a rotatably mounted elongated hollow drive spindle having an internal wall tapering inwardly from a tool holder receiving end thereof, a draw bar reciprocably mounted within the spindle and projecting from the other end thereof, means keying the draw bar to the spindle for rotation therewith, a hollow generally truncated conical split collet received within the tapering wall of the spindle and secured to the draw bar for reciprocation therewith, the spindle having a tool positioning shoulder and having a plurality of equally spaced radial slots adjacent its tool holder receiving end, a plurality of keys reciprocably mounted in the slots, means urging the keys toward the spindle axis, a tool holder removably mounted in the hollow collet and engaging the spindle shoulder in its operating position and having a plurality of equally spaced teeth, the teeth differing in number by one from the keys and facing the keys in the operating position of the tool holder and each key and tooth being narrower than the spacing between the teeth and keys respectively for the receipt of at least one key between adjacent teeth for positive driving action between the spindle and tool holder, the draw bar being movable axially after insertion of the tool holder in the collet to move the tool holder against the spindle shoulder for axial tool positioning and to provide gripping action of the collet and tool holder for a frictional driving action between the spindle and the tool holder.

6. In a machine tool, the combination comprising a rotatably mounted elongated hollow drive spindle having an internal wall tapering inwardly from a tool receiving end thereof, a draw bar reciprocably mounted within the spindle and projecting from the other end thereof, means keying the draw bar to the spindle for rotation therewith, a hollow generally truncated conical split collet mounted within the tapering wall of the spindle and secured to the draw bar for reciprocation therewith, the spindle having a tool positioning shoulder and having a plurality of equally spaced radial slots in its tool receiving end, a retainer secured to the tool receiving end of the spindle and closing the ends of the slots, a plurality of keys reciprocably mounted in the slots, means on the retainer and keys limiting the reciprocable movement of the keys, means urging the keys toward the spindle axis, a tool holder removably mounted in the hollow collet and engaging the spindle shoulder in its operating position and having a plurality of equally spaced teeth, the teeth being greater in number by one than the keys in juxtaposed relation with the keys in the operating position of the tool holder and each key and tooth being narrower than the spacing between the teeth and keys respectively for the receipt of at least one key between adjacent teeth for positive driving action between the spindle and tool holder, the draw bar being movable axially after insertion of the tool holder in the collet to move the tool holder against the spindle shoulder for axial tool positioning and to provide gripping action of the collet and tool holder for a frictional driving action between the spindle and the tool holder.

7. In a machine tool, a hollow rotatable spindle having a plurality of circumferentially spaced radial openings, a set of key elements reciprocably mounted within the openings, a socket-like split collet mounted within the spindle, and a tool holder removably mounted in the socket of said collet for tight frictional engagement therewith, the tool holder having a set of circumferentially spaced teeth elements positioned opposite the key elements in the operating position of the tool holder in the collet, the number of elements in each set being equal to a respective number other than one which is evenly divisible by a number which is equal to the number of elements in the other set, for receipt of at least one key element between adjacent teeth elements in all angular positions of the tool holder in the spindle, and means urging the key elements toward the tool holder for a positive drive connection between the spindle and tool holder in either direction of spindle rotation.

References Cited in the file of this patent

UNITED STATES PATENTS

| 56,631 | Stiles | July 24, 1866 |
| 1,075,311 | Beck | Oct. 7, 1913 |
| 1,196,529 | Doane | Aug. 29, 1916 |
| 1,289,867 | Moore | Dec. 31, 1918 |
| 2,009,371 | Junge | July 23, 1935 |
| 2,220,610 | Miller | Nov. 5, 1940 |
| 2,593,794 | Resina | Apr. 22, 1952 |
| 2,909,965 | De Vlieg | Oct. 27, 1959 |
| 2,935,329 | Hessler | May 3, 1960 |

FOREIGN PATENTS

| 921,536 | France | Jan. 13, 1947 |
| 59,326 | France | Jan. 4, 1954 |
| | (1st addition to No. 921,536) | |
| 697 | Great Britain | Jan. 10, 1911 |